US009937596B2

(12) United States Patent
Maurer

(10) Patent No.: US 9,937,596 B2
(45) Date of Patent: Apr. 10, 2018

(54) STEADY REST

(71) Applicant: SMW-Autoblok Spannsysteme GmbH, Meckenbeuren (DE)

(72) Inventor: Eckhard Maurer, Oberteuringen (DE)

(73) Assignee: SMW-Autoblok Spannsysteme GmbH, Meckenbeuren (DE)

( * ) Notice: Subject to any disclaimer, the term of this patent is extended or adjusted under 35 U.S.C. 154(b) by 0 days.

(21) Appl. No.: 15/146,219

(22) Filed: May 4, 2016

(65) Prior Publication Data

US 2016/0332270 A1 Nov. 17, 2016

(30) Foreign Application Priority Data

May 12, 2015 (EP) .................................. 15 167 238

(51) Int. Cl.
*B23Q 1/76* (2006.01)
*B24B 41/06* (2012.01)

(52) U.S. Cl.
CPC .......... *B23Q 1/76* (2013.01); *B23Q 2240/007* (2013.01); *B24B 41/06* (2013.01)

(58) Field of Classification Search
CPC ...... B23Q 1/76; B23Q 2240/007; B24B 41/06
See application file for complete search history.

(56) References Cited

U.S. PATENT DOCUMENTS 2,086,024 A * 7/1937 Flygare ................. B24B 41/065
451/408

3,535,963 A * 10/1970 Dietl ........................ B23Q 1/76
82/162
3,561,909 A * 2/1971 Flohr, Jr. .............. B24B 41/065
451/410

(Continued)

FOREIGN PATENT DOCUMENTS

DE 3543806 A1 * 6/1987 ............... B23Q 1/76
DE 4238616 A1 * 5/1994 ............... B23Q 1/76

(Continued)

*Primary Examiner* — Sara Addisu
(74) *Attorney, Agent, or Firm* — Pandiscio & Pandiscio

(57) ABSTRACT

In a steady rest (1) for centering a rotationally symmetrical workpiece (2) in the space, consisting of: two housing halves (4, 5) arranged at a distance from one another and firmly connected together, a middle steady rest arm (6) arranged between the two housing shells (4, 5) that is mounted in the housing shells (4, 5) by means of an actuation piston (7) so as to be moved in an axial direction (3) towards the workpiece (2), and two outer steady rest arms (11, 12) that are in a driving connection with the middle steady rest arm (6) workpieces (2) with the largest possible diameters should be held centerd in the space by the steady rest (one), while retaining the greatest possible movement of travel of the actuation piston (7). This is achieved in that the actuation piston (7) is formed from at least one first advance piston (31) and one second advance piston (32) that are mounted in an axially moving relationship with one another, that a pressure space (33) or (34) is assigned to each advance piston (31, 32) of the actuation piston (7) and that a line (35) emerges in each pressure space (33, 34) through which a pressurized medium can be pressed into the particular pressure space (33 or 34) or drawn out of it.

6 Claims, 4 Drawing Sheets

(56) References Cited

U.S. PATENT DOCUMENTS

| | | | | |
|---|---|---|---|---|
| 4,038,861 A * | 8/1977 | Hartkopf | B21D 3/00 414/745.9 |
| 4,276,723 A * | 7/1981 | Fournier | B24B 41/065 451/408 |
| 4,399,639 A * | 8/1983 | Lessway | B24B 41/065 294/119.1 |
| 4,416,174 A * | 11/1983 | Owsen | B23Q 1/76 451/408 |
| 4,463,635 A * | 8/1984 | Hafla | B23Q 1/76 294/116 |
| 4,465,422 A * | 8/1984 | Blust, Sr. | B23Q 1/76 408/45 |
| 4,519,279 A * | 5/1985 | Ruggeri | B23Q 1/76 294/116 |
| 4,546,681 A * | 10/1985 | Owsen | B23Q 1/76 294/116 |
| H45 H | 4/1986 | Gilmore | |
| D285,326 S | 8/1986 | Clark | |
| 4,638,655 A * | 1/1987 | Sebastian | B21B 25/02 72/208 |
| 4,650,237 A * | 3/1987 | Lessway | B25J 15/0266 294/119.1 |
| 4,754,673 A * | 7/1988 | Hiestand | B23Q 1/76 82/162 |
| 4,967,579 A * | 11/1990 | Haydo | B21B 25/02 72/428 |
| 5,150,545 A * | 9/1992 | Esteve | B23Q 1/36 33/501.02 |
| 5,201,501 A * | 4/1993 | Fassler | B23Q 1/76 269/156 |
| 5,237,780 A * | 8/1993 | Lessway | B23Q 1/76 451/408 |
| 5,282,403 A * | 2/1994 | Rouleau | B23B 31/1269 82/127 |
| 5,481,951 A * | 1/1996 | Kiefer | B23Q 1/76 82/162 |
| 5,860,341 A * | 1/1999 | Visigalli | B23Q 1/76 279/133 |
| 6,458,022 B1 * | 10/2002 | Folz | B23Q 1/76 269/196 |
| 7,913,596 B2 * | 3/2011 | Hirose | B23B 29/16 29/27 C |
| 8,266,992 B2 * | 9/2012 | Rehm | B23Q 1/76 451/408 |
| 8,286,955 B2 * | 10/2012 | Damang | B23Q 1/76 269/165 |
| 2001/0018323 A1 * | 8/2001 | Mulroy | B23Q 1/385 451/406 |
| 2002/0029668 A1 * | 3/2002 | Kroisandt | B23Q 1/0036 82/53 |
| 2008/0289463 A1 * | 11/2008 | Rehm | B23Q 1/76 82/164 |
| 2009/0001643 A1 * | 1/2009 | Rehm | B23Q 1/76 269/55 |
| 2011/0209591 A1 * | 9/2011 | Helm | B23Q 1/76 82/162 |
| 2013/0014620 A1 * | 1/2013 | Hangleiter | B23Q 1/76 82/164 |
| 2013/0047804 A1 * | 2/2013 | Maurer | B23Q 1/76 82/164 |
| 2015/0167707 A1 * | 6/2015 | Hyers | F16B 2/10 24/488 |
| 2016/0332271 A1 * | 11/2016 | Maurer | B23Q 1/76 |

FOREIGN PATENT DOCUMENTS

| | | | |
|---|---|---|---|
| EP | 0500405 | 8/1992 | |
| EP | 2210699 A1 * | 7/2010 | ........... B23Q 1/0009 |
| EP | 2848359 | 9/2013 | |
| WO | WO 2014020050 A1 * | 2/2014 | ......... B23B 31/1269 |

* cited by examiner

STEADY REST

REFERENCE TO PENDING PRIOR PATENT APPLICATION

This patent application claims benefit of European Patent Application No. 15 167 238.3, filed May 12, 2015, which patent application is hereby incorporated herein by reference.

FIELD OF THE INVENTION

The present invention relates to a steady rest in accordance with the pre-characterising clause of patent claim 1.

BACKGROUND OF THE INVENTION

Steady rests of this kind have been disclosed, for example, in EP 2848359 A1, by means of which a rotationally symmetrical workpiece is centred in the space and supported. Workpieces of this kind are shafts or hollow bodies, the outer jacket surface of which is to be machined using tools thereby generating considerable machining forces that act on the clamped workpiece and cause it to undergo flexure. Often, workpieces of this kind are several meters in length, as a result of which the steady rests required for supporting the workpieces are arranged at a specified spacing from one another in the area of the machine tool bed of a machine tool.

The machine tool bed of a machine tool only provides a limited space, however, which needs to accommodate additional elements as a result of which the size of the steady rest must be adapted to the available space in the machine tool. Furthermore, the steady rests must be aligned offset in a vertical direction or to the side by a slight amount in relation to the machine tool in order to encompass and centre the workpiece to be held from underneath.

The steady rests designed for this purpose chiefly consist of two housing shells in which three steady rest arms are arranged and can be moved. The steady rest arms are in a driving, active connection with a pneumatically or hydraulically operated pressure piston, by means of which the three steady rest arms can be moved synchronously using a guide slide in the direction of the workpiece to be clamped or away from it.

The middle steady rest arm is moved axially to and fro accordingly and the two outer steady rest arms make contact with the outside of the guide slide and perform a swivelling movement when the guide slide is actuated. This is because a control track is worked onto two opposite outside parts of the guide slide, and one of the free ends of each outer steady rest arm makes contact with this by means of arranged rollers, and thereby roll along the control track. The advance movement of the guide slide consequently causes the two outer steady rest arms, which are mounted on the housing shells in a rotating arrangement, to be moved towards or swivelled away from the workpiece.

As soon as the three steady rest arms encounter the surface of the workpiece simultaneously, clamping forces are applied by means of which the workpiece is held. These clamping forces as well as the movements of the three steady rest arms are achieved by means of the single-piece design of the actuation piston. As a result of the single-piece configuration of the actuation piston, it projects from the plane formed by the housing shells in order to achieve the optimum or maximum advance travel or stroke distance, with the effect that the axial advance travel or swivelling range of the three steady rest arms is as large as possible. The larger the diameter of a workpiece to be clamped, the longer the distance that the actuation piston has to cover.

However, only a limited amount of space is available in a machine tool and this is predominantly determined by the machine tool bed and the profile of the workpiece to be clamped, which means that the steady rests provided can only clamp a particular size of workpiece.

SUMMARY OF THE INVENTION

Therefore, it is the task of the present invention to develop a steady rest of the aforementioned type in such a way that, while maintaining the largest possible movement of travel of the actuation piston, the largest possible workpieces can be held centred in the space by the steady rest without the adjustment travel of the actuation piston being increased by the increased size of the workpiece.

Other advantageous further embodiments of the present invention are derived from the subordinate claims.

The actuation piston comprises a first part and a second part that are mounted in a telescoping arrangement and can be moved relative to one another, each part of the actuation piston has a pressure space allocated to it and a line emerges in each pressure space by means of which a pressurised medium can be forced into or drained from the corresponding pressure space, as a result of which the situation is achieved in an advantageous embodiment that the movement travel of the actuation piston is limited at least outside the housing plane formed by the housing shells without the stroke travel of the actuation piston being limited, meaning that even workpieces with a large diameter can be clamped and centred in space by the steady rest configured in accordance with the present invention.

As a result of the telescopic configuration of the actuation piston in at least one and two advance pistons, it is guaranteed that the size of the workpieces to be clamped can be adjusted variably to the stroke travel of the actuation piston, because the pressure spaces assigned to the particular advance pistons can be filled with a pressurised fluid or drained individually, i.e. in isolation, with the effect that either the first and/or the second advance piston of the actuation piston can be moved.

The movement travel of the actuation piston is consequently not achieved outside the plane formed by the housing shells, but takes place almost completely inside the pressure spaces formed by the actuation piston. As a result, the structural space specified by the machine tool can be optimally utilised, and the adjustment possibility of the steady rest is significantly increased.

It is particularly advantageous if parts of the actuation piston are integrated in the steady rest housing and plunge into it, because this achieves a situation in which the length of the actuation piston is accommodated at least in part within the steady rest housing.

BRIEF DESCRIPTION OF THE DRAWINGS

The drawing shows a sample embodiment of a steady rest configured in accordance with the present invention, the details of which are explained below. In the drawing.

DETAILED DESCRIPTION OF THE INVENTION

Figure 1:
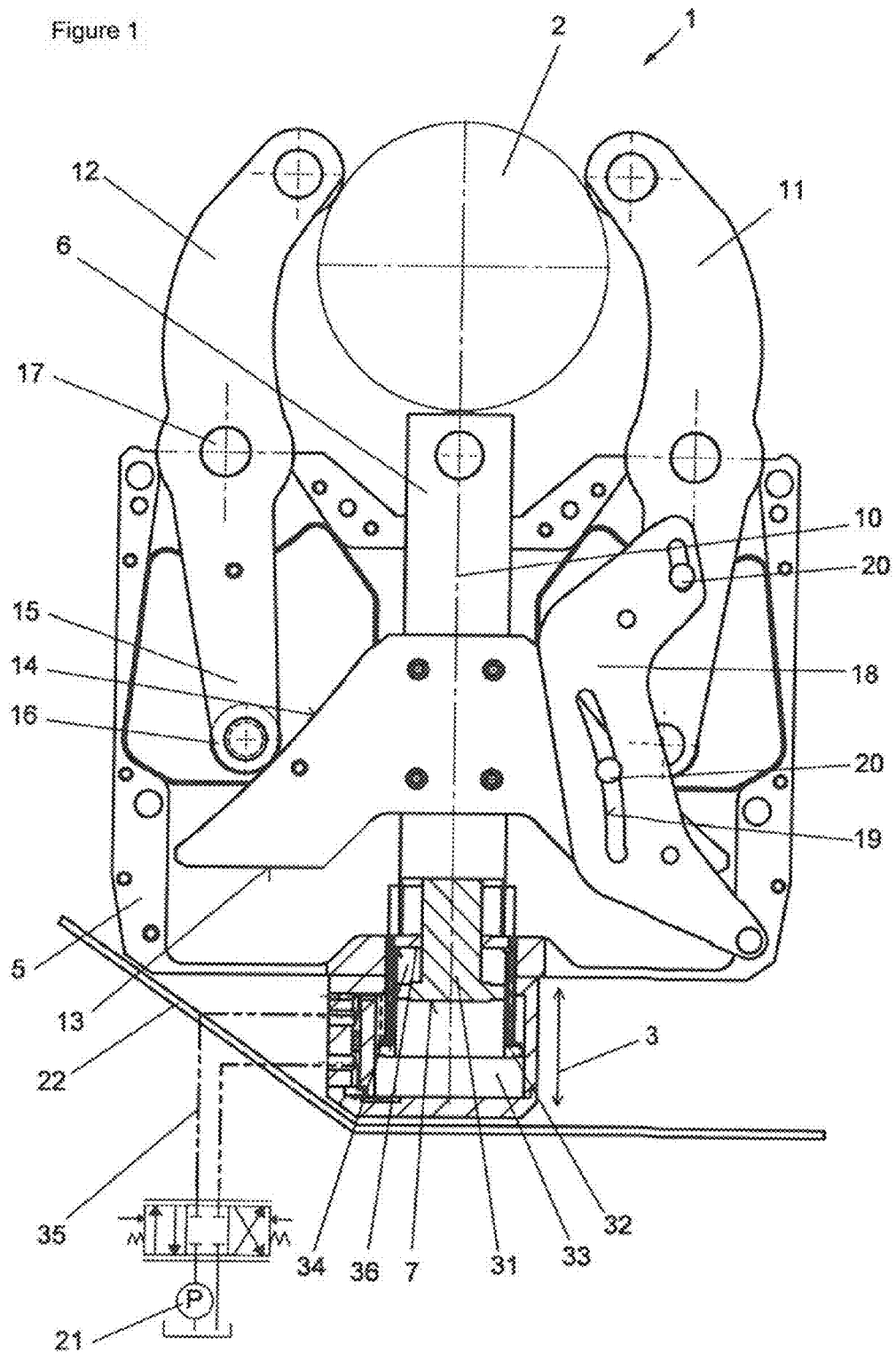
FIG. 1 shows a steady rest with two housing shells, between which an actuation piston is arranged comprising two parts that are mounted so they can move one inside the other in a telescoping arrangement, with three steady rest arms that are connected to the actuation piston in a driving arrangement and can be moved by them in order to clamp a workpiece on a workpiece bed of a machine tool, in a section view.

FIG. 1 shows a steady rest 1 by means of which a workpiece 2 is centred or held in the space, in such a way that the longitudinal axis of the workpiece 2 runs in the straightest possible line, i.e. without bowing and flush with the longitudinal axis of the machine tool. The workpieces 2 are rotationally symmetrical shafts or hollow bodies that are machined by a machine tool that is illustrated schematically. The machine tool bed of the machine tool is indicated by reference number 22. Often, the machine tool exerts considerable machining forces on the workpiece 2 and these must be absorbed by the steady rest 1 without the longitudinal axis of the workpiece 2 being shifted, since if that happened the precise machining steps would not be able to be achieved.

The steady rest 1 consists of two housing shells 4 and 5 which are arranged at a distance from one another and enclose a space. The housing shells 4 and 5 are firmly connected together. Furthermore, the housing shells 4 and 5 form a longitudinal axis 10 which must be aligned at right angles to the axis of rotation of the workpiece 2 in order to achieve a reliable attachment of the steady rest 1 on the workpiece 2.

Furthermore, the steady rest 1 consists of an actuation piston 7 which is acted upon by a pneumatic or hydraulic pressurised medium, for example, and runs flush with the longitudinal axis 10 of the housing shells 4, 5. The actuation piston 7 generates an axial stroke movement aligned in the direction of the workpiece 2 or away from it, and which is identified with the reference number 3 in the figures.

The actuation piston 7 has a middle steady rest arm 6 attached to it, which is thus in a driving active connection with the actuation piston 7, and can be moved by it in the movement direction 3 axially towards the workpiece 2 or away from it. The middle steady rest arm 6 consequently forms a first support for the workpiece 2.

Two further supports required by the middle steady rest arm 6 are formed by two outer steady rest arms 11, 12 which are mounted in a rotating or sliding arrangement by means of a joint 17 on the housing shells 4 and 5.

In order to move the two outer steady rest arms 11, 12 synchronously with the middle steady rest arm 6, the actuation piston 7 has a guide slide 13 attached to it with a roof-shaped or V-shaped outer contour, in which case the tip of the roof or of the V is arranged adjacent to the workpiece 2 and the side surfaces of the guide slide 13 rise in relation to the longitudinal axis 10.

The opposite outer flanks of the guide slide 13 are configured as a control track 14 along which rollers 16 attached to each of the free ends 15 of the outer steady rest arms 11, 12 roll and are in permanent contact, as is explained in more detail below.

Figure 2A:
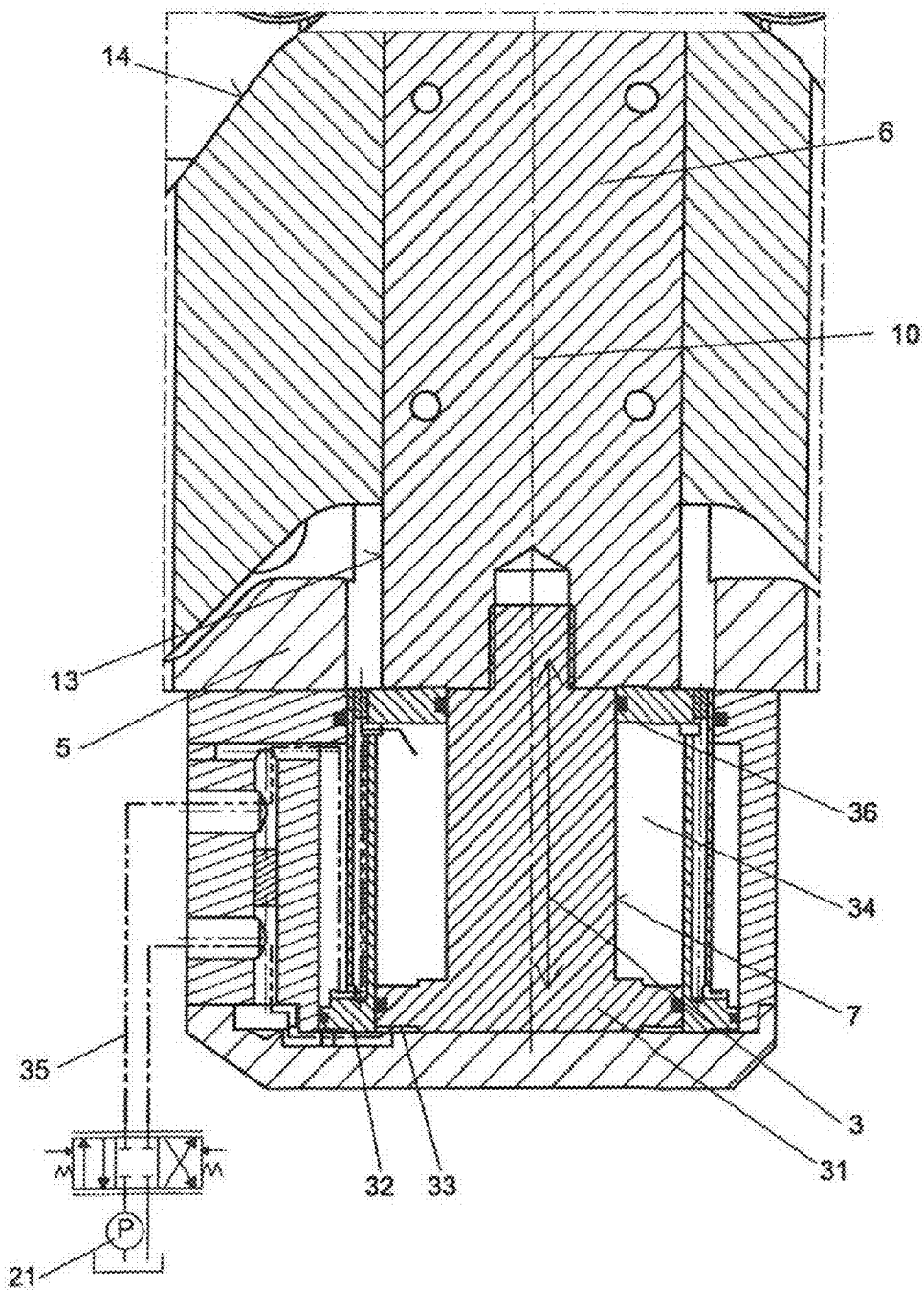
FIG. 2a shows the actuation piston consisting of a first and a second advance piston, in accordance with FIG. 1, in a magnified view in the initial position.
Figure 2B:
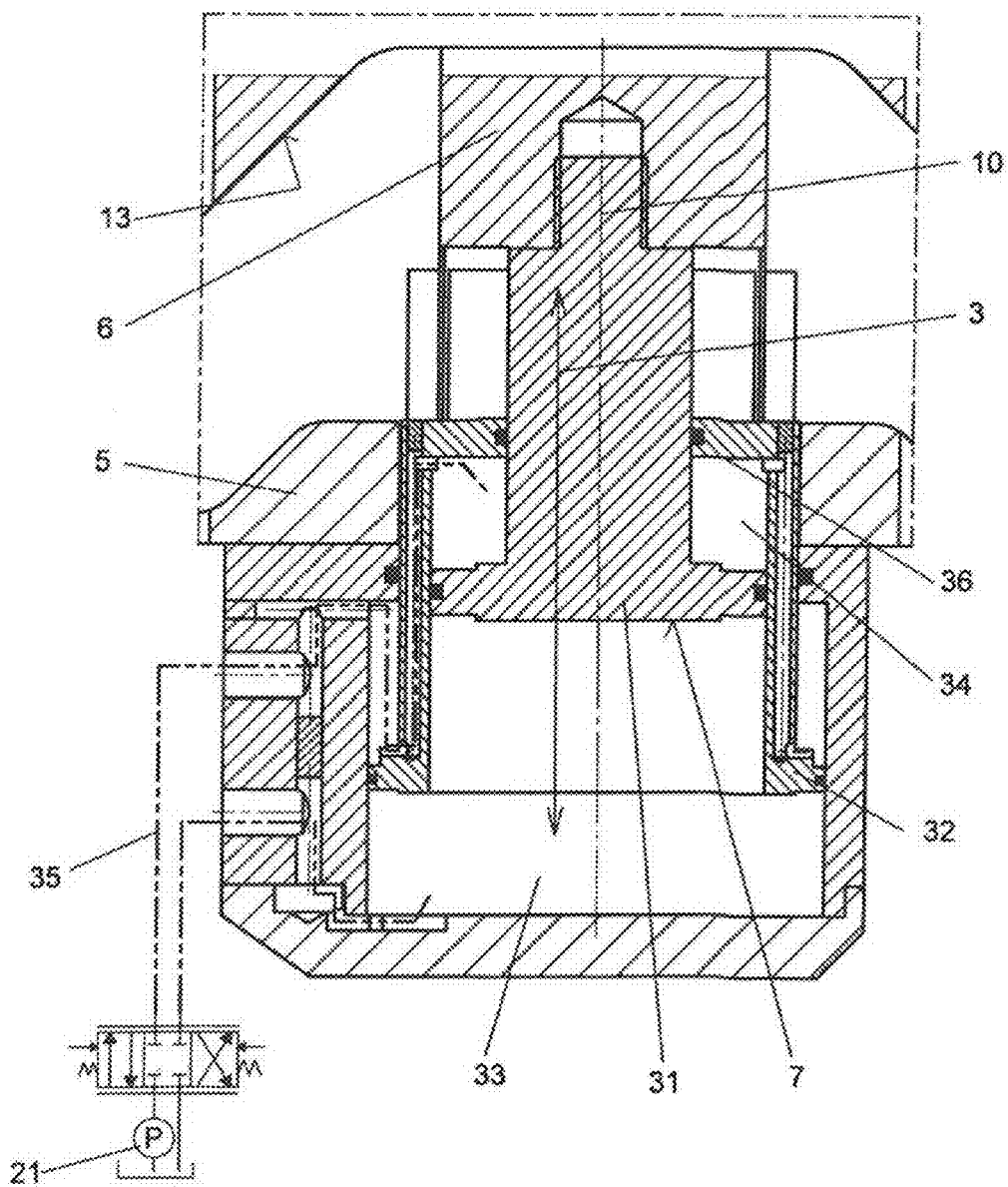
FIG. 2b shows the actuation piston according to FIG. 2a in a middle position.
Figure 2C:
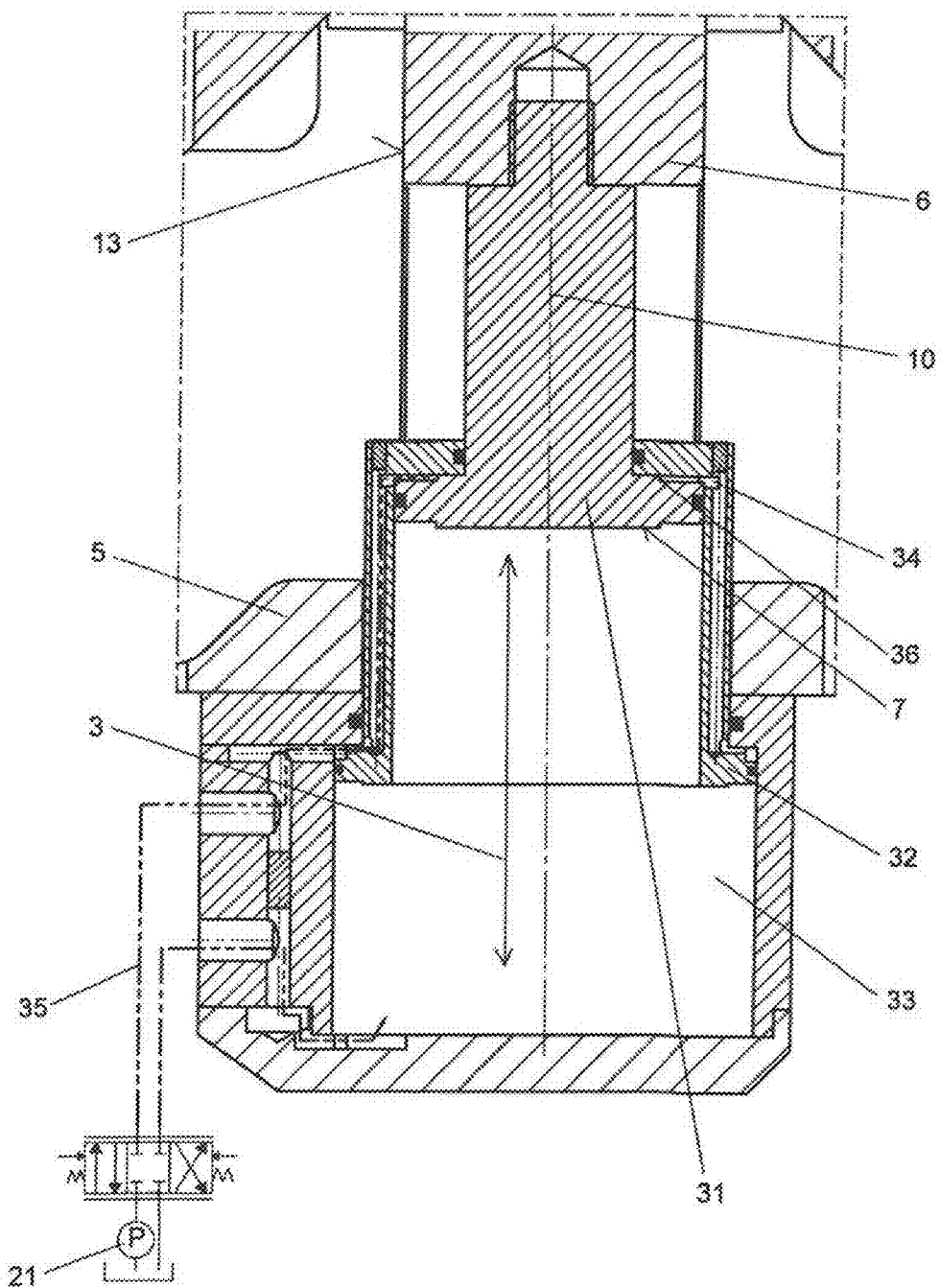
FIG. 2c shows the actuation piston according to FIG. 2a, in an end position.

FIG. 2a shows that a workpiece 2 with a large diameter, for example 600 mm, is clamped, with the effect that the size of the workpiece 2 specifies the position of the guide slide 13 in the housing shells 4 and 5, because the smaller the diameter of the workpieces 2 to be clamped, as is shown schematically in FIGS. 2b and 2c, the more the position of the guide slide 13 changes in the housing shells 4 and 5.

FIGS. 2a, 2b and 2c also show that the actuation piston 7 has a telescopic embodiment. Consequently, the actuation piston 7 consists of a first advance piston 31 and a second advance piston 32 which can be moved in relation to one another, because each advance piston 31 or 32 of the actuation piston 7 is assigned to a pressure space 33 or 34 that are spatially separated from one another. Lines 35 emerge in each of the two pressure spaces 33 and 34, and the lines can be filled or drained by means of a control device or a pump 21 which provides a pressurised fluid such as hydraulic oil.

As soon as hydraulic oil is forced into the first pressure space 33 by means of the pump 21, the first advance piston 31 of the actuation piston 7 moves out of its initial position according to FIG. 2a to a first advance position in the direction of workpiece 2 and the second advance piston 32 moves at the same time. The movement travel or stroke travel of the first advance piston 31 of the actuation piston 7 provided in the pressure space 33 according to FIG. 2b is limited by a stop 36. Consequently, as soon as the end position of the first advance piston 31 of the actuation piston 7 on the stop 36 has been reached, hydraulic oil is pressed into the second pressure space 34, with the effect that the second advance piston 32 of the actuation piston 7 is moved in the direction of the workpiece 2 according to FIG. 2a, meaning that the actuation travel of the steady rest arms 6, 11 and 12 that may still have to be covered is traversed and, secondly, the necessary clamping force is generated on the three steady rest arms 6, 11 and 12.

As a result of the telescopic arrangement of the actuation piston 7, the space required for this is significantly reduced while retaining the necessary length of the stroke travel.

The actuation piston 7 with a telescopic embodiment comprises, as is known, a first and second part 31 and 32. The second part 32 of the actuation piston 7 plunges at least partially into the housing shells 4, 5 which form the steady rest housing, with the effect that the length of the actuation piston 7 is partially accommodated in the housing shells 4, 5. This means the length of the actuation piston 7 is reduced.

What is claimed is:

1. A steady rest (1) for centering a rotationally symmetrical workpiece (2) in the space, consisting of:
    two housing shells (4, 5) arranged at a distance from one another and firmly connected together,
    a middle steady rest arm (6) arranged between the two housing shells (4, 5) that is mounted in the housing shells (4, 5) by means of an actuation piston (7) so as to be moved in an axial direction (3) towards the workpiece (2), and
    two outer steady rest arms (11, 12) that are in a driving connection with the middle steady rest arm (6), and the actuation piston (7) moves the middle steady rest arm (6) and the two outer steady rest arms (11, 12) synchronously,
    characterised in that,
    the actuation piston (7) is formed from at least one first advance piston (31) and one second advance piston (32) that are mounted in an axially moving telescopic relationship with one another, that a pressure space (33) or (34) is assigned to each advance piston (31, 32) of the actuation piston (7) and that a line (35) emerges in each pressure space (33, 34) through which a pressurized medium can be pressed into the particular pressure space (33 or 34) or drawn out of it.

2. The steady rest in accordance with claim 1, characterised in that,
the two pressure spaces (33, 34) are spatially separated from one another and can be filled with the pressurized medium or drained independently from one another.

3. The steady rest in accordance with claim 1, characterised in that,
a stop (36) is provided in the first pressure space (33) by means of which the stroke travel of the first advance piston (31) of the actuation piston (7) is limited.

4. The steady rest in accordance with claim 1, characterised in that,
a stop (37) is provided in the second pressure space (34) by means of which the stroke travel of the second advance piston (32) of the actuation piston (7) is limited.

5. The steady rest in accordance with claim 1, characterised in that,
the particular line (35) is connected to a control device, preferably a pump (21), by means of which each of the lines (35) can be filled with the pressurized fluid or drained independently from one another.

6. The steady rest in accordance with claim 1, characterised in that,
the actuation piston (7) is arranged at least in part within the housing shells (4, 5) and that when the actuation piston (7) is actuated, the second piston (32) of the actuation piston (7) plunges into the housing shells (4, 5).

* * * * *